Dec. 25, 1962  R. C. BAUBLES  3,069,961
SCREW THREADED MEMBER
Filed Jan. 4, 1960  4 Sheets-Sheet 1
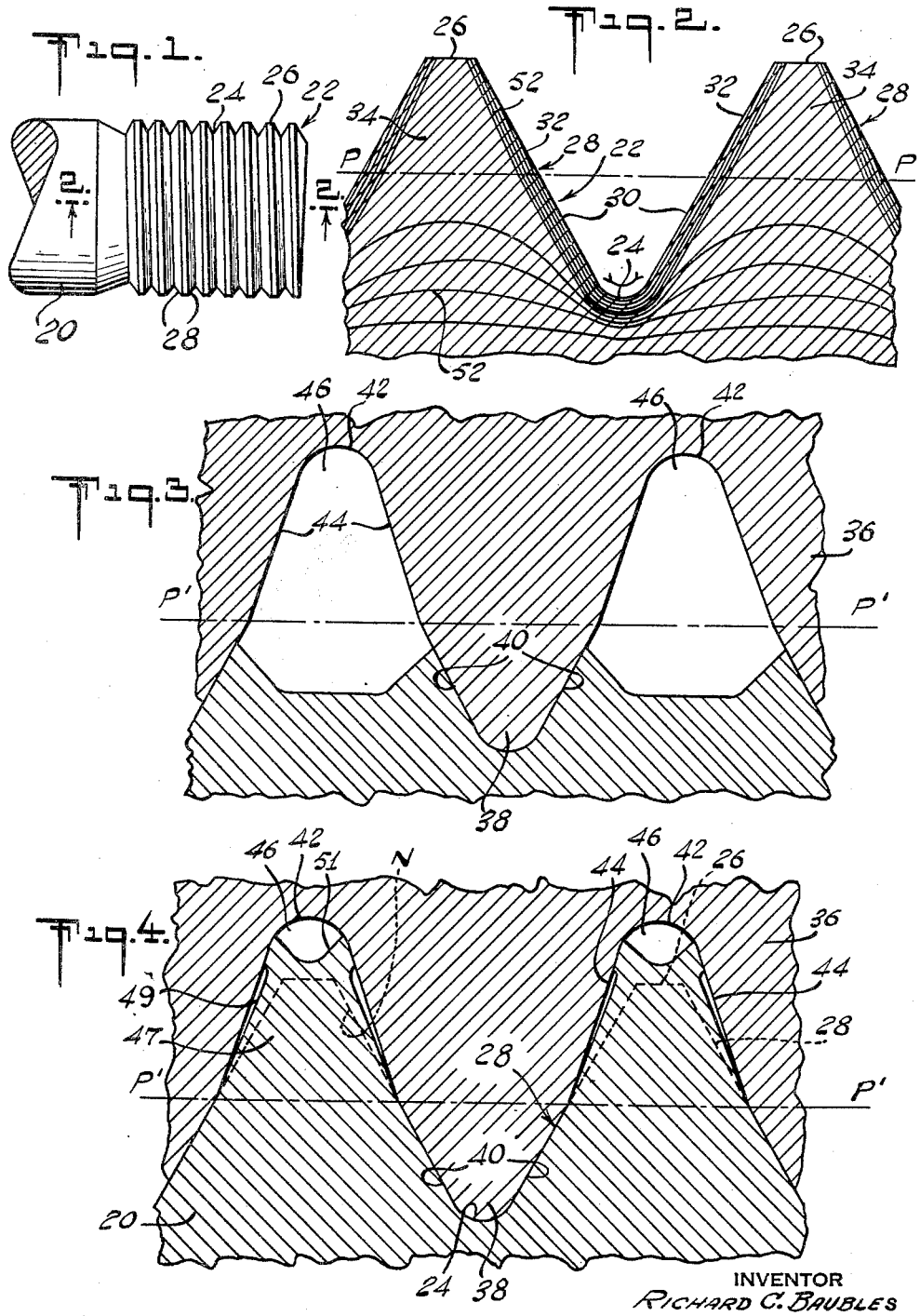
INVENTOR
RICHARD C. BAUBLES
BY
Prangley, Baird, Clayton, Miller + Vogel
ATTORNEYS

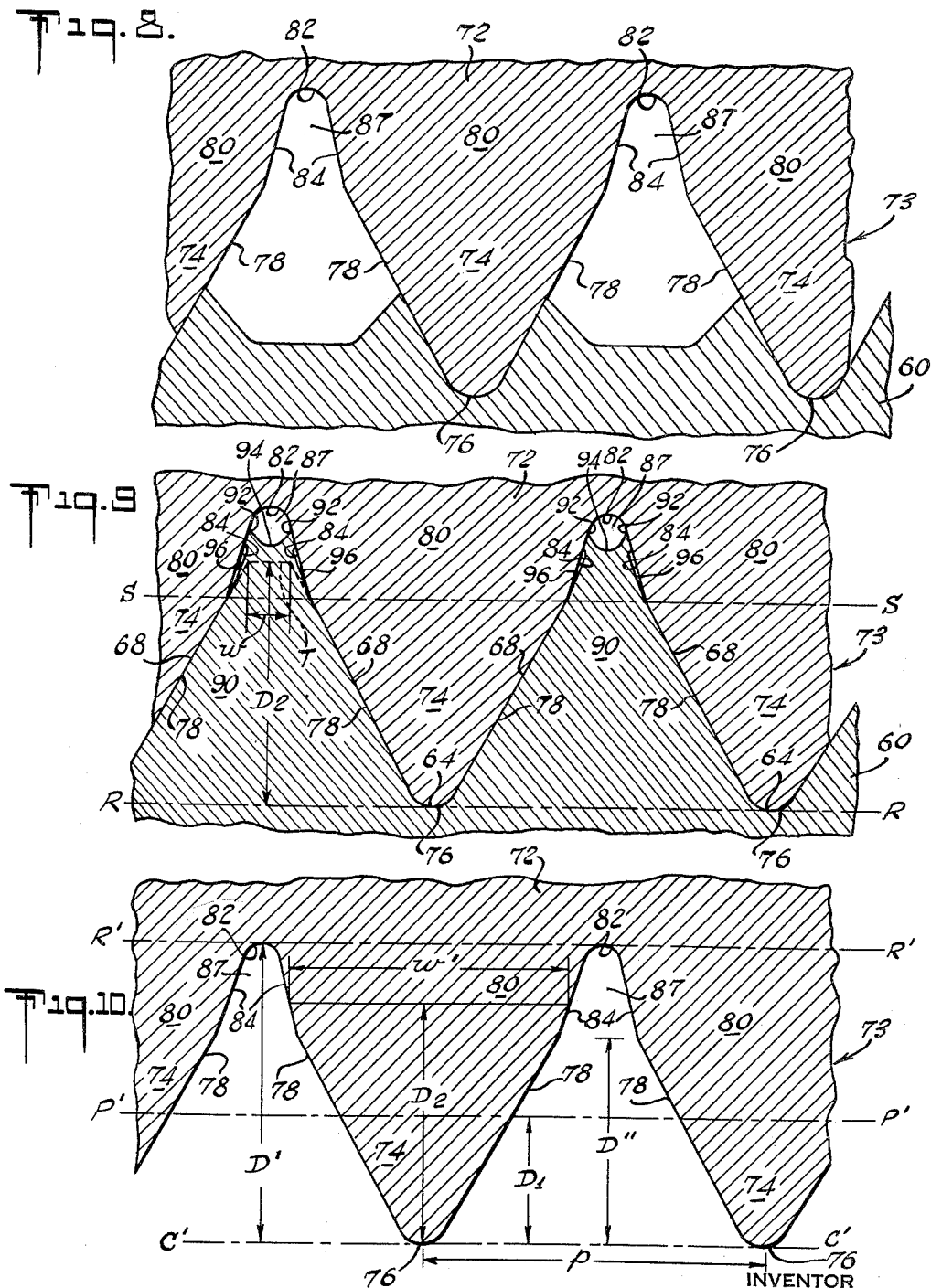

Dec. 25, 1962   R. C. BAUBLES   3,069,961
SCREW THREADED MEMBER
Filed Jan. 4, 1960   4 Sheets-Sheet 4
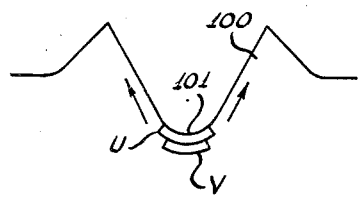
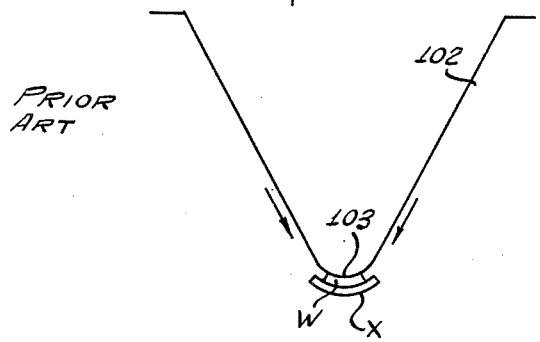
PRIOR ART
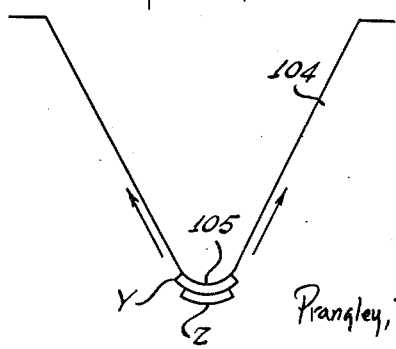
INVENTOR
RICHARD C. BAUBLES
BY
Prangley, Baird, Clayton, Miller & Vogel
ATTORNEYS

United States Patent Office 3,069,961
Patented Dec. 25, 1962

3,069,961
SCREW THREADED MEMBER
Richard C. Baubles, West Orange, N.J., assignor to Elastic Stop Nut Corporation of America, Union, N.J., a corporation of New Jersey
Filed Jan. 4, 1960, Ser. No. 337
12 Claims. (Cl. 85—1)

This invention relates to an externally threaded member, such as a screw, bolt, or other externally threaded stud or article, and to method for making the same.

The fatigue failure of externally threaded members is of grave concern to many industries, particularly the aircraft industry, where repeated loading of an externally threaded member commonly causes failure at stress levels which are far below those at which failure could be expected under static conditions.

Fatigue failure of the threaded portion of an externally threaded member has heretofore always begun at the root of the thread.

It has been known for many years that a rolled thread is superior in fatigue strength or fatigue life to a thread formed by other methods, and it has previously been suggested that a thread formed by other methods may be improved in respect to fatigue strength by finish rolling of the thread.

Externally threaded members formed by the thread rolling method are generally superior in fatigue strength to threads formed by other methods and subsequently finish rolled in their crest or root portions. Moreover, finish rolling of the root portions of threads of the common or most popular sizes used on aircraft is not feasible or practical from the standpoint of cost and satisfactory mass production tooling. It is accordingly an object of this invention to provide an externally threaded article having superior fatigue strength or life characteristics and to devise a method for making the same.

Another object of the invention is to provide a rolled thread capable of formation in blanks of greater hardness than have heretofore been deemed capable of use for such purpose.

Other and further objects and advantages of the invention will be apparent from the following description when taken with the accompanying drawings in which—

FIGURE 1 is a fragmentary view in elevation of an externally threaded member embodying the invention;

FIGURE 2 is an enlarged, fragmentary view in section taken on the line 2—2 of FIGURE 1, and showing flow lines of the member of FIGURE 1;

FIGURE 3 is an enlarged fragmentary view in section through the axis of a work piece showing a preferred form of die for making an article embodying the invention, the parts being shown shortly after the die has first engaged the work piece at the start of the rolling operation;

FIGURE 4 is a view similar to FIGURE 3 showing the parts at the end of the rolling operation;

FIGURE 8 is a view similar to FIGURE 3 showing a die for making the member of FIGURES 6 and 7;

FIGURE 9 is a view similar to FIGURE 8 showing the parts at the end of the thread rolling operation;

Figure 5:
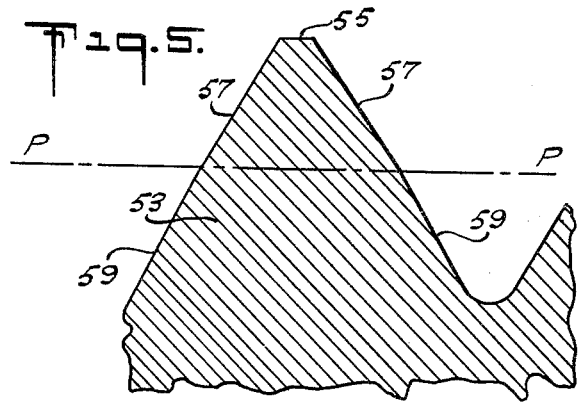
FIGURE 5 is a view in section similar to FIGURE 2 but showing a further form of external thread.

FIGURE 10 is a view similar to FIGURES 8 and 9 but showing the die of FIGURES 8 and 9 by itself; and FIGURES 11, 12 and 13 are diagrammatic views illustrating why the fatigue improvement made possible by the invention is thought to occur.

Referring now to FIGURE 1, the member or article 20, such as a metal screw, bolt, or other externally threaded stud or article, is provided with an external thread 22 having a root 24, a crest 26 and flanks 28.

The thread 22 in form and dimensions corresponds to a typical thread of the Unified thread form, with a thread angle of 60°, but it is to be understood that the invention is also applicable to external threads of other thread forms.

As shown in FIGURE 2, the root or root portion 24 of the thread 22 is rounded and the crest 26 flat, the root 24 being a rolled or coined surface and the flat 26 a machined surface. Each thread flank 28 comprises a rolled or coined surface portion 30 extending from the root to the pitch cylinder P—P and a ground, or other machined, surface portion 32 extending from the pitch cylinder to the flat 26. The portion of the thread beyond the pitch cylinder is extruded from the body of the article by the thread rolling operation, as hereafter described.

It should be understood that the thread 22 according to this invention is formed on a cylindrical blank portion of a minimum tolerance diameter slightly greater than the maximum pitch diameter for the desired thread size.

In the manufacture of high tensile bolts according to this invention, the bolt blank is hardened prior to thread rolling to a hardness above 37 Rockwell C and preferably between 42 Rockwell C and 53 Rockwell C, or even higher.

At this point it may be stated that by the practice of this invention it has been found possible to roll threads in material of higher hardness (and consequently higher tensile strength) than has heretofore been capable of accomplishment.

The thread 22 is formed by a sequence of operations consisting of, first, a thread rolling operation to form a rolled or coined thread portion having the root surface 24 and the flank surfaces 30 inwardly of the pitch cylinder P—P and to form a freely extruded thread portion 34 extending beyond the pitch cylinder P—P and having free extruded or extrusion surfaces. The thread rolling operation is followed by a cutting or grinding step, or other surface machining operations, simultaneously or sequentially performed, to form the flats 26 and the flank portions or surfaces 32 extending outwardly from the pitch cylinder P—P.

The thread rolling operation may be performed by the usual thread rolling mechanism employing, however, specially formed dies of which the die 36, shown in FIGURES 3 and 4, is illustrative. Each die 36 has a first section including a crest portion 38 and flank portions 40 extending inwardly from the crest portion 38 to the pitch line P'—P' and a second section including a root portion 42 spaced from the crest portion 38 a distance substantially greater than the depth of the thread to be formed by the die and joined by flank portions 44 to the flank portions 40 at the pitch line P'—P'. The included angle between the flank portions 44 is substantially less than the included angle between the flank portions 40 so that an orifice through which the metal may be extruded is formed at the junction of the flank portions 44 with the flank portions 40. The flank portions 44 and root portions 42 thus define a relief cavity or free expansion space 46 which beyond the extrusion orifice, or inwardly of the pitch line P'—P', is greater in volume than the volume of material which will be extruded thereinto by the coining operation of the die upon the surface of the article or blank 20.

The flank portions or surfaces 44 of each die 36 are preferably relatively inclined at an included angle of 29°, each such flank surface being formed preferably at an angle of 75½° to the pitch line P'—P', although it may vary with the composition or nature of the alloys or materials being worked and with variations in size or form of the thread 22. In any event, the angle of inclination of these flank portions 44 to the pitch line P'—P' should be sufficiently great that the flank surfaces 44 do not come into work-shaping, pressure or coining engagement with the surface of the material extruded into the cavity by the coining operation of the die upon the article 20.

During the rolling operation, a plurality of like dies 36 progressively penetrate the body 20. Die crest portion 38 is the first part of each die 36 to engage the body 20, followed immediately by flank portions 40. These die portions together exert a coining force on the body 20 to cause the surface thereof to conform in every respect to such portions of the dies. FIGURE 3 shows the relationship of each die 36 to the body 20 at an early stage of the thread rolling operation.

In continuing the thread rolling operation, the dies move material of the body 20 toward the pitch lines P'—P' of the dies while continuing to coin the surface of the body and confining material of the body 20, as in any coining operation, within the walls of the dies. As the dies continue to penetrate the body 20, the material of the body, which has been displaced outwardly from the original cylindrical surface thereof by the coining portion or surfaces 38 and 40 of the dies, reaches the extrusion orifices at the pitch lines P'—P' of the dies and thereafter further inward movement of the dies toward the axis of the body 20 causes the material displaced by the coining operation to be freely extruded through those orifices, into the extrusion cavities 46 of the dies, and into shapes determined substantially entirely by the extrusion forces exerted on the material by the coining operation of the dies on the metal body 20. Thus when the dies 36 have been moved the required distance toward the axis of the body 20 so that the pitch lies P'—P' of the dies correspond, or substantially coincide, with the pitch cylinder P—P, i.e., substantially the original cylindrical surface of the body 20, as shown in FIGURE 4, the body 20 has formed therein and therefrom a thread-like portion 47 having the coined root portion or surface 24 for the final thread 22 and the flank portions or surfaces 30 for the final thread 22 inwardly of the pitch cylinder P—P and also having flank portions or surfaces 49, outwardly of the pitch cylinder P—P and recessed crests 51. It is to be noted that the flank portions 44 of the die cavities 46 do not exert any substantial work-shaping pressures on the thread 47 or on the flank surface portions 49 of that thread.

During the described coining operation on the body 20, forces are generated within and along the surface of body 20 in a direction parallel to the surface of flank portions 40 of the dies and away from the axis of the body 20. Forces are also generated within and near the surface of the body 20 in a direction perpendicular to and away from the axis of the body. The resultant effect of these forces is to produce an extrusion force causing the material as it is extruded into the cavities 46 of the dies to expand beyond the normal thread form lines indicated by the dashed line N in FIGURE 4 and to which thread form the material would be confined and shaped by the walls of the prior art die cavities. Applicant has found that in order to prevent the die portions or surfaces 44 from exerting any substantial work shaping pressures on the flanks of the free extrusion portion of the thread 47 beyond the pitch cylinder P—P and pitch lines P'—P' as aforesaid, it is necessary that such die flank portions be inclined at an angle, with respect to the pitch line P'—P', which is not less than about 75½°.

Following the forming of the thread-like form or portion 47 in and from the body 20, the flank surfaces 49 and the crest surfaces 51 are machined, as by a cutting, grinding or other surface machining operation, to the standard thread outline, as in FIGURE 2, and as indicated by the dashed line N in FIGURE 4.

In FIGURE 5 there is shown a thread 53 embodying the invention. Like thread 22, thread 53 may be made from thread 47. Thread 53 has a crest 55 of the same major diameter as crest 26 of thread 22. The pitch cylinder of thread 53 is also indicated by line P—P. Thread 53 has flank portions 57 further from the axis of thread 53 than pitch cylinder P—P and flank portions 59 closer to the axis of the thread 53 than pitch cylinder P—P. Flank portions 57 make a smaller angle with the axis of thread 53 than do flank portions 59. The included angle between flank portions 57 is preferably on the order of 70°. Thus outwardly of pitch cylinder P—P thread 53 is thinner than thread 22 at corresponding distances from the thread axis. Thread 53 has the advantage in that it may be more readily formed from thread 47 by presently available machining tools than thread 22.

The hardened body 20 prior to threading is characterized by grain structure flow lines indicating fiber orientation and extending predominantly parallel to the axis of the body. On completion of the thread 22 by the methods herein disclosed, the flow lines near the surface of the body 20 and throughout the thread 22 follow the paths indicated by the lines 52 in FIGURE 2. These flow lines 52, indicative of grain structure, follow generally the contour of the thread 22 and show a highly compressed grain structure at the root of the thread; a parallel grain structure at and near the coined surfaces 30 and non-parallel grain structures intersecting the machined surfaces 32 at a slight angle and intersecting the machined surfaces of the flat 26 at a sharp angle, whereas in prior rolled threads the grain structure is uninterrupted. Comparative fatigue tests of bolts having standard rolled threads and bolts provided with the external thread 22 of FIGURE 2 show a remarkable improvement in fatigue characteristics in favor of the thread 22. Such comparative fatigue tests showed, for example, that the average cycles to failure of a ⅜-24 thread of a 180 k.s.i. bolt tested at a stress level of 120,000 p.s.i. had been increased, on the average over 3 times, and when tested at a stress of 83,000 p.s.i., had been increased on the average, over twenty times and that the average cycles to failure of a 220 k.s.i. bolt was increased, on the average, from thirty to two hundred times for a wide range of stress levels.

For highest fatigue strength or life, it is essential that at and near the root surface of an external thread, where the tensile stress under applied load will be greater, a residual stress be induced which is compressive rather than tensile. The higher the residual compressive stresses at and near the root surface, the greater will be the fatigue strength or life because the greater the residual compressive stresses at and near the root surface the less the probability of a tensile fatigue crack. Hence, the externally threaded article will be able to withstand for a longer time or for more cycles of loading the failure-causing tensile stresses exerted generally axially of the threaded article.

The present invention achieves a substantial increase in the residual compressive stress of the thread root area. The theoretical reason for this increase and the resultant improvement in fatigue characteristics appears from the following analysis.

In the case of a thread rolled in accordance with the hitherto accepted standard practice, all surfaces of the external thread including the flank and crest surfaces outwardly of the pitch cylinder, or the external cylindrical surface of the blank, are coined by the forming pressure of the die crest surfaces and the surfaces of the die cavities, including the die cavity surfaces inward of the pitch lines of the dies. The coining of the flank and root surfaces of the thread inwardly of the pitch cylinder tends to create desirable compressive stresses at the root 24 while the coining of the surfaces outwardly of the pitch cylinder if performed according to standard practice tends to reduce the magnitude of the residual compressive stresses at the root.

Since in the formation of the thread 22 the thread portion 34 outwardly of the pitch cylinder is freely extruded, i.e. no substantial work shaping or coining pressures are externally applied to the extruded portions, and the flank and crest surfaces of that extruded portion of the thread are not formed by a coining operation, but by cutting, grinding, or other surface machining operations, compressive or back pressure stresses are not created in the extruded portions 34 and, therefore, the advantageous residual compressive stresses created by the coining of the flank and root surfaces inwardly of the pitch cylinder are not diminished and remain at the maximum values in the finished part.

In view of the well known fact that the heat treatment of a threaded member removes previously induced residual stresses, and may induce new largely uncontrollable, residual stresses, it is essential to the securement of the benefits of this invention that the member, body or article to be threaded be hardened prior to the thread forming operation.

The forming of the external thread 22 according to the methods herein disclosed causes a substantial increase in the hardness of the coined surfaces 24 and 30 of the member or article, as for example, from a blank hardness of 42 Rockwell C to about 50 Rockwell C, while the hardness of the remaining surfaces, as for example the crest surface, is substantially unaffected.

Measurements made, by the standard three-wire method of measuring pitch diameter, in order to determine changes in the pitch diameter resulting from release of the residual stresses at the root of the thread for a standard rolled thread and for the thread 22 have established that the residual compressive stresses at the root of the thread 22 are remarkably greater than any residual compressive stress at the root of any standard thread.

For some usages, the final machining of the flank surfaces outward of the pitch cylinder, and/or the final machining of the crests, may be eliminated.

This invention also enables threads to be formed on harder blanks than has heretofore been possible. Thus, with methods of the prior art it may be possible to roll threads on blanks of a maximum hardness of about 47 Rockwell C, whereas by this invention threads can be rolled on blanks of a hardness up to 52 or 53 Rockwell C, and even higher. This means that parts of considerably higher ultimate tensile strength can be produced by the practice of this invention than has heretofore been possible.

While in the preferred embodiment of the invention as disclosed hereinbefore, the entire extruded portion of the thread is formed without external application thereto of any substantial work shaping or coining pressures, applicant has found that surprising improvement in fatigue life may be obtained and the required machining of the flank surfaces minimized, by the use of dies having smaller relief cavities.

Figure 6:
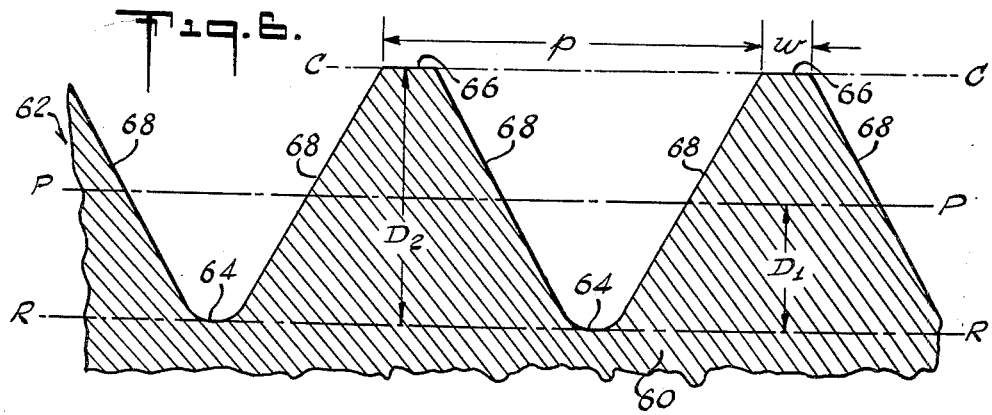
FIGURE 6 is a view similar to FIGURE 2 of a modified externally threaded member embodying the invention, with no flow lines being shown.
Figure 7:
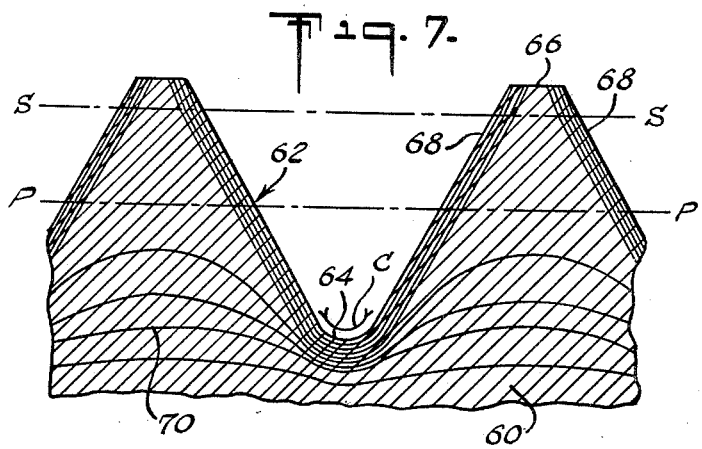
FIGURE 7 is a view similar to FIGURE 6 but showing flow lines of the member of FIGURE 6.

As shown in FIGS. 6 and 7 the article 60 has an external screw thread 62 which includes a root 64, a crest 66 and flanks 68 joining root 64 and crest 66.

Root 64 of thread 62 defines a root cylinder indicated in FIG. 6 at R—R and crest 66 defines a crest cylinder indicated in FIG. 6 at C—C.

Thread 62 is of a predetermined pitch $p$. Flanks 68 extend outwardly from root 24 at a thread angle of 60° and define a pitch cylinder indicated in FIGS. 6 and 7 at P—P. Cylinder P—P is coaxial with and located a dedendum distance $D_1$ from root cylinder R—R. Crest cylinder C—C is coaxial with root cylinder R—R and spaced therefrom a distance $D_2$ which is the height of the external thread. The maximum value of $D_2$ is the sum of dedendum distance $D_1$ and 0.32476 times pitch $p$. Thread 62 has a standard width of flat ($w$) at crest 66 equal to 0.125 times pitch $p$. These dimensions are standard for Unified external threads.

In each of FIGS. 8, 9 and 10 there is shown in fragmentary section a thread rolling die 72, and having a thread forming rib or ribs indicated generally at 73. Rib 73 is of a predetermined pitch $p$ (FIG. 10) and has an outer portion 74 having a crest 76 defining a crest line or cylinder indicated in FIG. 10 at C'—C'. Outer portion 74 also has outer flanks 78 extending from crest 76 at a first thread angle of 60° and defining a pitch line or cylinder indicated in FIG. 10 at P'—P'. Pitch line P'—P' is located the thread dedendum distance $D_1$ (FIG. 10) from crest line C'—C'.

Rib 73 also includes an inner portion 80 providing a root 82 defining a root line or cylinder indicated in FIG. 10 at R'—R'. Root line R'—R' is tangential to root 82 and is located a distance $D'$ (FIG. 10) from crest line C'—C'. $D'$, which is the height of rib 73, is greater than the height $D_2$ of the external thread. Inner portion 80 also has inner flanks 84 joining outer flanks 78 at a distance $D''$ (FIG. 10) from crest line C'—C' and which is less than $D_2$. Inner flanks 84 extend from outer flanks 78 toward root 82 at a thread angle which is less than 60° and join root 82. Rib 73 has a width $w'$ (FIG. 10) which is less than 0.875 times pitch $p$ at the distance $D_2$ from crest line C'—C'.

Root 82 and flanks 84 provide die 72 with a relief cavity 87 the width of which at distance $D_2$ from the crest line C'—C' is greater than the width of flat $w$ of the thread crest 66.

Specifically in die 72 distance $D''$ is only slightly less than the standard thread height $D_2$ and is considerably greater than dedendum distance $D_1$.

The manner of forming thread 62 with the aid of die 72 will now be described, with particular reference to FIGS. 8 and 9. FIG. 8 shows die 72 engaging body 60 shortly after a thread rolling operation has begun and FIG. 9 shows die 72 engaging body 60 at the end of the thread rolling operation.

During the rolling operation ribs 73 of a set of dies 72 progressively penetrate the body 60. Die crest 76 of each die is the first part to engage body 60, followed immediately by outer flanks 78, these parts of each die 72 together applying external coining force to a part only of the surface of body 60, until, shortly after the rolling operation has begun, the parts are as shown in FIG. 8. The rolling operation continues until at the end thereof the parts are as shown in FIG. 9. During the rolling operation each die 72 has applied external coining force to a part only of the surface of body 60 to form thereon an inner portion of a thread 90, this inner portion being the same as a part of thread 62, having root 64 defining root cylinder R—R tangential to root 64 and inner flanks 68 extending outwardly from root 64 at a first thread angle of 60° and defining pitch cylinder P—P, see FIG. 6, coaxial with and located dedendum distance $D_1$ from root cylinder R—R. The outer extremities of flanks 68 of the inner coined portions of thread 90 define a cylinder, indicated in FIG. 9 at S—S, coaxial with and located the distance $D''$ from root cylinder R—R. The width of the inner portion of thread 90 at the outer extremity of such inner portion is greater than the standard thread crest width $w$, which as stated is equal to 0.125 times pitch $p$.

During the coining step just described material of body 60 is extruded outwardly, into relief cavity 87 to form an outer portion of thread 90, this outer portion including a crest having a pair of peaks 92 and a valley 94 therebetween. Each peak 92 is located a distance from root cylinder R—R greater than $D_2$. It should be remembered that $D_2$ equals the sum of $D_1$ and 0.32476 times pitch $p$. The outer portion of thread 90 also has outer flanks 96 extending inwardly from peaks 92 at a second thread angle of less than 60° and joining inner flanks 68 at the outer extremities thereof.

The method described takes place wholly without application of external force to the crest of thread 90 between peaks 92. The crest of thread 90 is thus uncoined between peaks 92.

At the conclusion of the thread rolling operation the diameter of root cylinder R—R is equal to the desired final root diameter of the thread, and the width of thread 90 is greater than 0.125 times pitch $p$ at a distance from root cylinder R—R equal to the standard thread height $D_2$.

It is to be noted that during the thread rolling operation just described, the surface of body 60 is coined into the form of the final root surface and the final flank surfaces of the desired thread inwardly of a cylinder located from the final root surface a distance greater than the dedendum distance of the thread and less than the standard height of the thread and that material of the body is substantially freely outwardly extruded beyond the coined flank surfaces. It is also to be noted that thread 90 has a coined root, coined flank surfaces inwardly of the cylinder referred to and a substantially freely extruded portion beyond the coined flank surfaces.

Threads 90 can be, if desired, converted to thread 62 by removing, as by grinding or other machining operation, that part of thread 90 which is outside lines T (FIG. 9). Thus in thread 62 crest 66 is machined as are those parts of flanks 68 further from root cylinder R—R than cylinder S—S.

The initial diameter of that part of body 60 on which thread 90 was rolled was slightly greater than the pitch diameter of threads 90 and 62 in order to provide the material which at the end of the rolling operation lies outside lines T.

The second thread angle of die 72 is preferably about 29° and the second thread angle of thread 90 is also about 29°.

On completion of the thread 62 by the methods herein disclosed, the flow lines near the surface of the body 60 and throughout the thread 62 follow the paths indicated by the lines 70 in FIGURE 7. These flow lines 70, indicative of grain structure, follow generally the contour of the thread 62 and show a highly compressed grain structure at the root of the thread; a parallel grain structure at and near the flank surfaces 68 inward of cylinder S—S and non-parallel grain structures intersecting flank surfaces 68 outward of cylinder S—S (i.e. the machined parts of flank surfaces 68) at a slight angle and intersecting the crest 66 at a sharp angle.

The thread angle of the inner portion of each of dies 36 and 72 is 29°, and in a thread rolling operation utilizing either of these dies the thread angle of the outer portion of the resultant thread is about 29°. It has been found that, with a second die thread angle of less than 29° the thread angle of the outer portion of the resultant thread is still about 29°, thus indicating that in the use of dies 36 and 72 little or no work-shaping or forming pressure is applied to the work piece by die flank surfaces 44 and 84.

Remaining for explanation is the theory as to why externally threaded members of FIGS. 1 to 5 and FIGS. 6 to 9 have so much greater residual compression stress at the critical root area than external threads produced by prior art thread rolling methods and dies. For this explanation reference is made to FIGS. 11, 12 and 13.

In FIG. 11 there is shown part of an article having a partially formed external rolled thread 100 having a root 101, thread 100 being formed on a metal body by either a prior art die or a die embodying the invention, the die having exerted no back pressure along the flanks of thread 100. The action of the die has lengthened the fibers at the surface of the body at root 101 as indicated by the arrows in FIG. 11 and has lengthened the fibers just inside the surface of the body at root 101, by a lesser amount, and so on toward the axis of the body. Consider a mass U of material at the surface of the body at root 101 and a mass V inside the body and immediately adjacent adjacent mass U, and assume that masses U and V were of the same length prior to any deformation of the body. As stated, the action of the die has tended to cause a greater permanent lengthening of mass U than mass V, and if masses U and V were free, such lengthenings would occur independently of each other. However, masses U and V cannot slide freely with respect to each other, so mass U exerts force tending to lengthen mass V, and conversely mass V exerts force tending to shorten mass U. This last mentioned force tends to build into mass U a residual compression stress.

In FIG. 12 there is shown part of a prior art article having a finished external rolled thread 102 having a root 103, thread 102 being formed on a metal body by a prior art die the root of which exerted a back pressure on the thread crest and down the flanks of thread 102 at the end of the rolling operation, as indicated by the arrows in FIG. 12, this back pressure tending to shorten the fibers at the surface of the body at root 103 and, by a lesser amount, the fibers of the body just inside the surface of the body, and so on toward the axis of the body. Consider a mass W of material at the surface of the body at root 103 of thread 102 and a mass X inside the body and immediately adjacent mass W, and assume that masses W and X were of the same length prior to any deformation of the body. Until the back pressure was applied, starting near the end of the rolling operation, the action was as explained above in connection with FIG. 11. The back pressure tends to shorten each of masses W and X, but the tendency is for mass W to be shortened more than mass X. However, masses W and X can not slide freely with respect to each other, so mass W exerts force tending to shorten mass X, and conversely mass X exerts force tending to lengthen mass W, and it is this last mentioned force which tends to nullify the residual compression stress in mass W or which may even result in a residual tension stress in mass W.

In FIG. 13 there is shown part of an article embodying the invention having a finished thread 104 having a root 105 and having been formed by the method of the invention with a set of dies embodying the invention and which exerted no pressure on the thread crest and substantially no back pressure down the outer portions of the thread flanks. The condition shown in FIG. 13 is similar to that of FIG. 11. The arrows in FIG. 13 indicate that the dies did not tend to shorten the fibers at and just inside root 105, this condition being further indicated by masses Y and Z which are similar, respectively, to masses U and V of FIG. 11. Thus for the same reasons given above in connection with FIG. 11, a high residual compression stress is built into mass Y.

Residual compression stress in any element tends to relieve itself by lengthening the element in the direction of the stress. It would therefore be assumed that in the case of a threaded body in which the root of the thread is in residual compression lengthwise of the body, material could be removed from the thread to allow the compression stress to relieve itself at least partially and in so doing to cause measurable dimensional change.

An elongation test involved two solid specimens of a nominal hardness of 38 on the Rockwell C scale and having ½-20 external rolled threads having a thread angle of 60 degrees. The thread of the first specimen embodied the prior art, whereas the thread of the second specimen was produced by a rolling operation in which the dies exerted no pressure on the crest of the thread and substantially no back pressure down the outer portions of the thread flanks.

The pitch diameter of the thread of the first specimen of the elongation test was measured by the standard three-wire method using 0.02887 inch diameter wires, which are of the so-called "best size" for threads of the size and angle involved. This involved three test locations, the first on one side of the specimen and the other two on the other side of the specimen.

Material was then carefully removed from the exterior of the first specimen to expose first, second, third and fourth plane surfaces. The first and second surfaces were parallel and identical and faced away from each other and were parallel to the axis (hereinafter called the "test wire axis") defined by the test wire at the first test location while the pitch diameter was being measured as aforesaid, and the first and second surfaces were on opposite sides of the test wire axis and were separated by a distance slightly less than the pitch of the thread and were equidistant from the test wire axis. The third and fourth surfaces were in a common plane which was: perpendicular to the first and second surfaces; parallel to the test wire axis, and to the third axis; and tangential to the thread root on the same side of the specimen as the first test location. The third surface intersected and provided the inner limit of the first surface and was entirely on the same side of the first test location as the first surface, and the fourth surface intersected and provided the inner limit of the second surface and was entirely on the same side of the first test location as the second surface.

Thus the thread root at the first test location of the first specimen of the elongation test remained securely anchored in its original position, but the parts of the thread between the exposed surfaces were freed. Under these circumstances it would be expected that residual stress originally present at the thread root at the first test location would be at least partially relieved to change the thread angle, and an original compression stress would be expected to result in a spreading of the thread flanks and a decrease in the indicated pitch diameter at the first test location.

Following the removal of material from the first specimen of the elongation test the pitch diameter was again measured using the same test locations and the same wires.

The identical procedure outlined above was followed in the case of the second specimen of the elongation test. The distance between the first and second surfaces of the second specimen was the same as that of the first specimen.

It was found that the indicated pitch diameter of each of the first and second specimens of the elongation test decreased, the decrease in the case of the first specimen being 0.0002 inch and the decrease in the case of the second specimen being 0.0004 inch. These results: (a) indicate that each of the first and second specimens of the elongation test originally had a residual compression longitudinal stress at the root at the first test location and elsewhere; (b) confirm that the present invention has achieved a notable increase in this stress; and (c) give further explanation for the great fatigue life improvement made possible by the present invention.

This is a continuation-in-part of each of copending applications Serial No. 644,548 filed March 7, 1957, now abandoned and Serial No. 740,656 filed June 9, 1958.

While there have been illustrated and described herein the preferred embodiments of an external thread embodying the invention, and of methods and apparatus for making such thread, it will be appreciated that this has been done to enable those skilled in the art to appreciate and practice the invention, the true scope of which is indicated by the appended claims.

What is claimed is:

1. The method of forming an external thread in a metal body, comprising the steps of coining the surface of the body into the form of the final root surface and the final flank surfaces of the desired thread to a depth less than the standard thread height and simultaneously and substantially freely outwardly extruding the material of said body through an orifice and beyond the said coined flank surfaces and beyond the standard thread height.

2. The method of forming an external thread in a metal body, comprising the steps of coining the surface of the body into the form of the final root surface and the final flank surfaces of the desired thread inwardly of a cylinder located from said final root surface a distance not less than the dedendum distance of said thread and less than the standard height of said thread and simultaneously and substantially freely outwardly extruding the material of said body through an orifice and beyond said coined flank surfaces and thereafter machining the surfaces of the thread beyond said cylinder to the desired thread form.

3. The method of forming a hardened externally threaded article comprising the steps of hardening the article prior to threading to the approximate desired hardness, coining the surface of the article into the form of the final root surface and final flank surfaces of the desired thread inwardly of the standard crest diameter of such thread and simultaneously and substantially freely extruding material of the article outwardly through an orifice and beyond said coined flank surfaces and thereafter machining the flank and thread crest surfaces of the freely extruded portion beyond the coined flank surfaces to the desired thread form.

4. An externally threaded article of which the external thread comprises a coined root, coined flank surfaces inwardly of the standard crest diameter and a portion simultaneously and substantially freely extruded through an orifice and having machined flank surfaces beyond the coined flank surfaces.

5. An externally threaded article of which the external thread comprises a coined root, coined flank surfaces inwardly of a cylinder located from said root a distance not less than the dedendum distance of said thread and less than the standard height of said thread and a portion simultaneously and substantially freely extruded through an orifice and having machined flank surfaces beyond the coined flank surfaces.

6. A metal stud having an external thread comprising a coined portion inwardly of the standard crest diameter and characterized by fibers under high residual compressive stress at the root and fiber flow lines near the surface of said portion extending generally parallel to the root surface and the flank surfaces, and a portion simultaneously and substantially freely extruded through an orifice and extending beyond the coined flank surfaces and characterized by fiber flow lines near the surface of said substantially freely extruded portion converging substantially from the outer limit of said coined portion toward and intersecting the flank surfaces of said extruded portion.

7. A metal stud having an external thread comprising a coined portion inwardly of a cylinder located from the root of the thread a distance not less than the dedendum distance of said thread and less than the standard height of said thread and characterized by fibers under high residual compressive stress at the root and fiber flow lines near the surface of said portion extending generally parallel to the root surface and the flank surfaces, and a portion simultaneously and substantially freely extruded through an orifice outwardly of said cylinder and characterized by fiber flow lines near the surface of said substantially freely extruded portion converging substantially from said cylinder toward and intersecting the flank surfaces of said extruded portion.

8. A metal body having an external rolled screw thread of a predetermined pitch thereon, said thread having an inner portion having a coined root defining a root cylinder tangential to said root and coined inner flanks extending outwardly from said root at a first thread angle of 60° and defining a pitch cylinder coaxial with and located a first distance from said root cylinder, said thread also having an outer portion simultaneously and substantially freely extruded through an orifice and having a crest having a pair of peaks and a valley therebetween, said crest uncoined between said peaks, each said peak located a distance from said root cylinder greater than the sum of said first distance and 0.32476 times said pitch, said outer portion also having outer flanks extending inwardly from said peaks at a second thread angle of less than 60° and joining said inner flanks at a distance from said root cylinder less than said sum, the width of said thread greater than 0.125 times said pitch at a distance equal to said sum from said root cylinder.

9. The invention set forth in claim 8 wherein the width of every part of said thread is greater than 0.125 times said pitch.

10. The invention set forth in claim 8 wherein said second thread angle is about 29 degrees.

11. The method of forming an external thread in a metal body comprising rolling the sections of the thread lying inside an imaginary cylinder substantially less in diameter than the final crest diameter of the thread to their final desired root diameter and final thread angle and simultaneously and substantially freely extruding the material within said cylinder outwardly through an orifice to form the sections of the thread lying outside that cylinder without substantial work-shaping pressures and with adjacent flank surfaces at an included angle substantially less than said thread angle.

12. The method of forming an external thread in a metal body which comprises first hardening the body to the approximate desired hardness, rolling the sections of the thread lying inside an imaginary cylinder substantially less than the final crest diameter of the thread to their final shape, simultaneously and substantially freely extruding the metal outwardly from within the cylinder through an orifice to form sections of the thread lying outside that cylinder without substantial work-shaping pressures and thereafter machining the surfaces of the thread sections lying outside the imaginary cylinder to the desired thread form.

References Cited in the file of this patent

UNITED STATES PATENTS

| 1,865,575 | Locke | July 5, 1932 |
| 2,335,590 | Gersman | Nov. 30, 1943 |
| 2,656,740 | Redker | Oct. 27, 1953 |
| 2,750,034 | Gersman | June 12, 1956 |

FOREIGN PATENTS

| 564,269 | Great Britain | Sept. 20, 1944 |
| 751,103 | Germany | Sept. 22, 1952 |

OTHER REFERENCES

Roll Threading, "American Machinist," pages 152–159, July 9, 1951.

An Investigation of the Laws of Plastic Flow, Scientific Paper No. 278, by Eugene C. Binghan, Bureau of Standards Bulletin, volume 13, 1917, QC 1 U 5.

The Extrusion of Metals, Pearson, chapter 5, pages 98–113, published by John Wiley and Sons Inc., 1953.